United States Patent Office 3,219,832
Patented Nov. 23, 1965

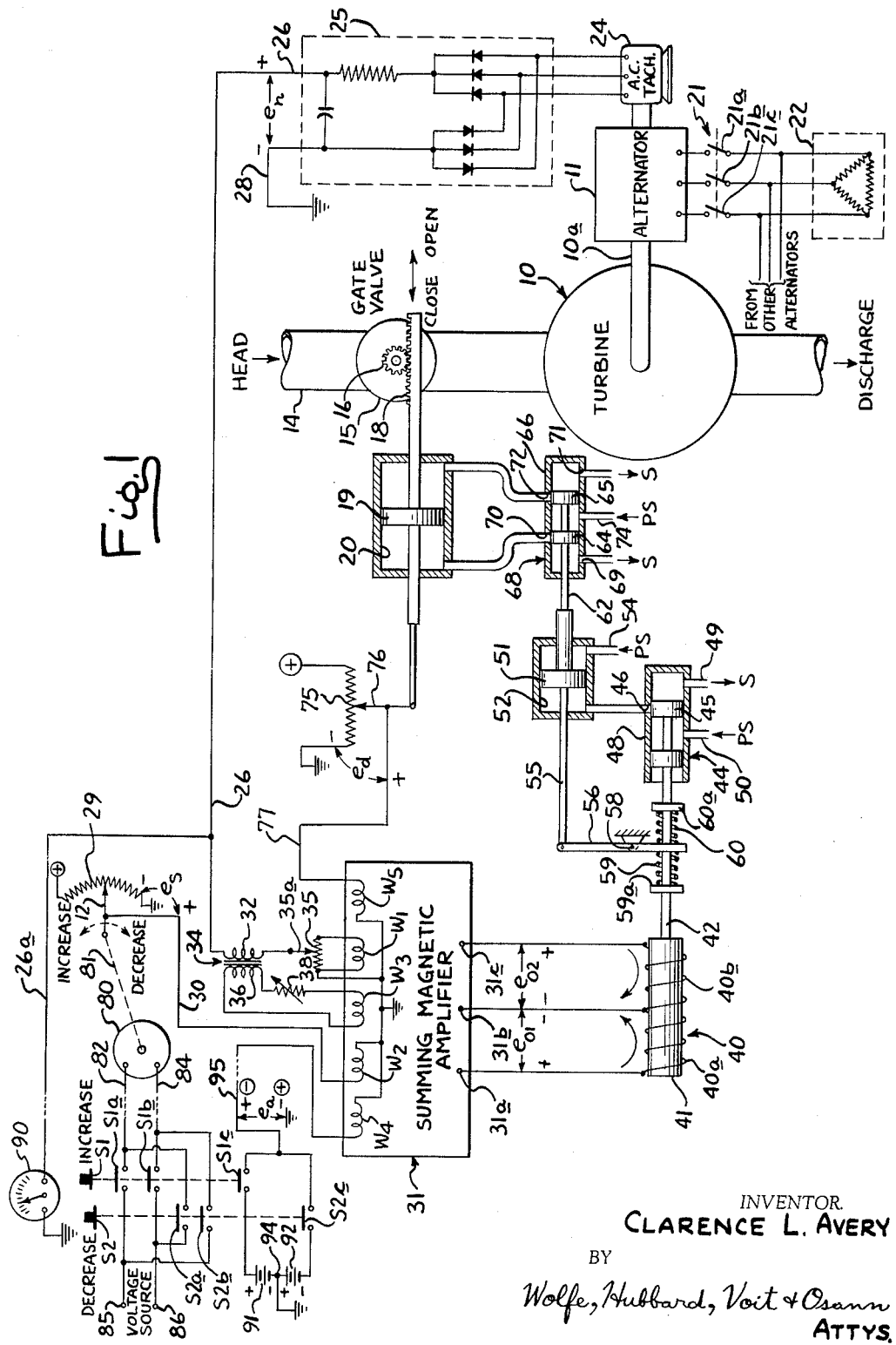

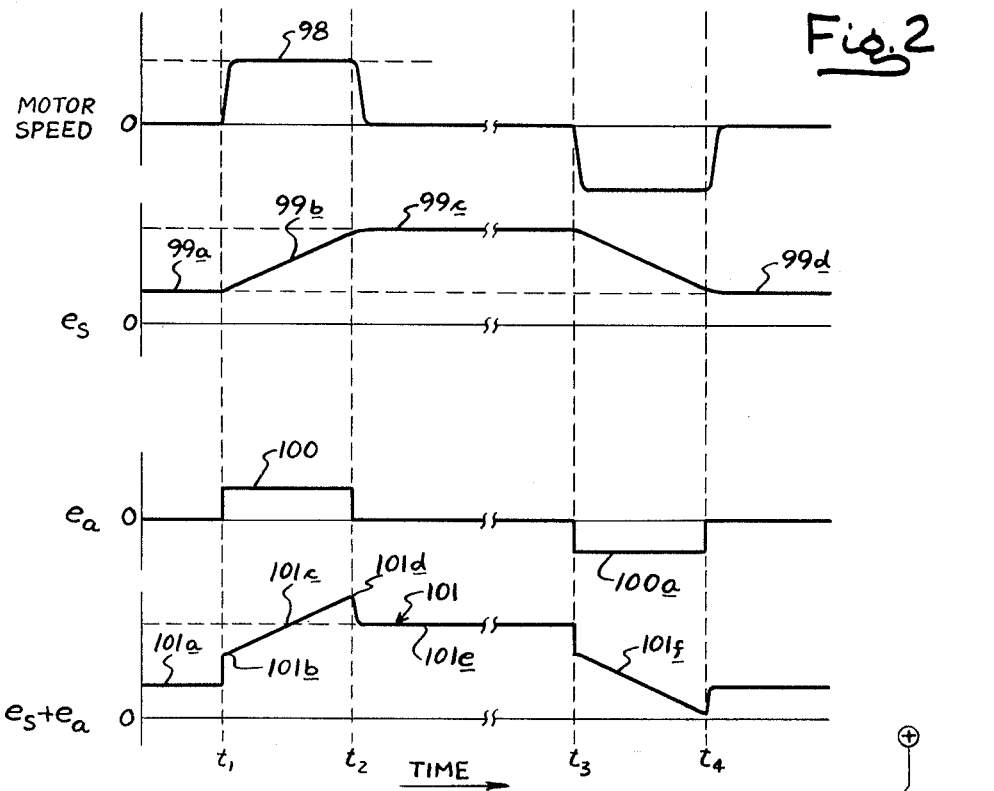
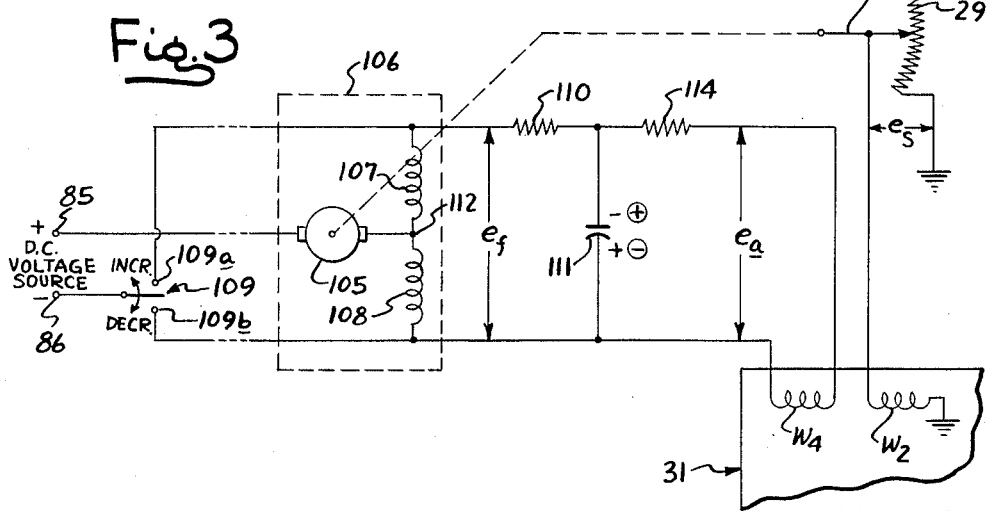

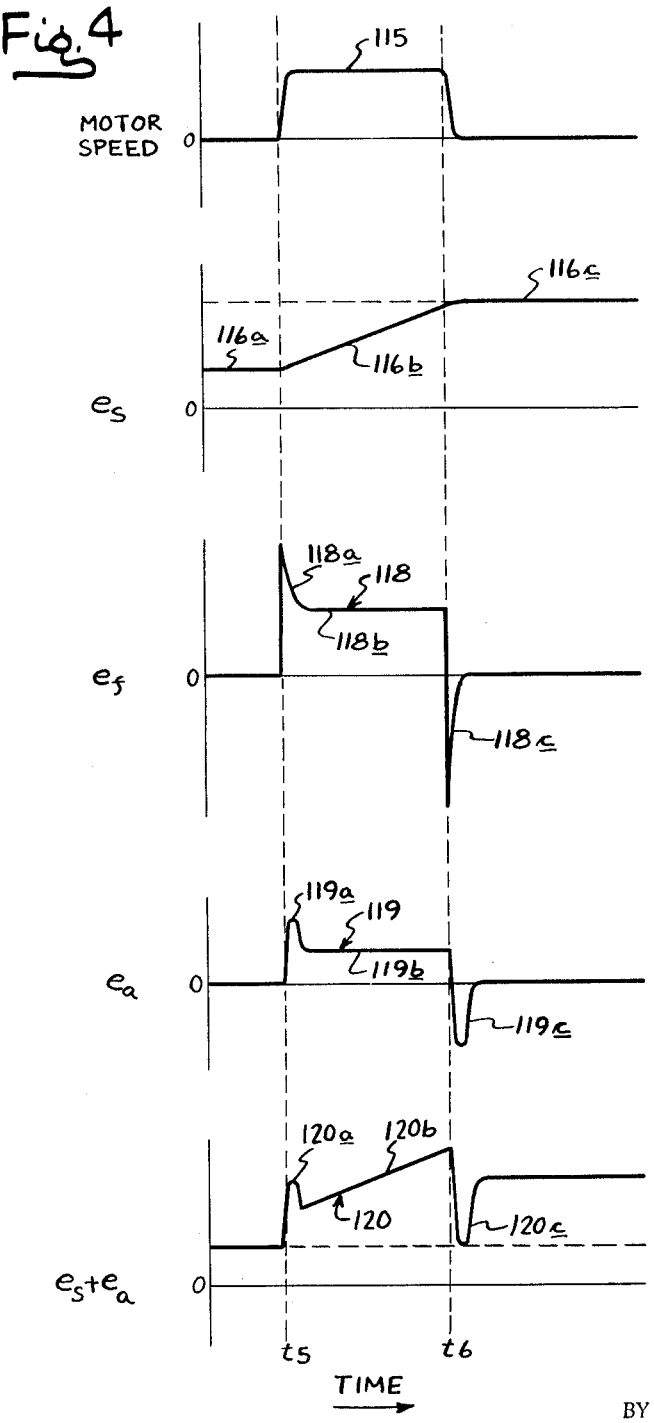

3,219,832
CONTROL SYSTEM WITH QUICK RESPONSE TO REFERENCE CHANGES
Clarence L. Avery, Rockford, Ill., assignor to Woodward Governor Company, Rockford, Ill., a corporation of Illinois
Filed June 18, 1962, Ser. No. 203,152
8 Claims. (Cl. 290—40)

The present invention relates in general to automatic control systems, and in particular to systems for automatically maintaining a variable condition (e.g., position, speed, temperature, pressure, etc.) in agreement with a reference condition or set point which is adjustable. While not so limited in its uses, the invention finds especially advantageous employment in such control systems where the reference condition is adjustable by remotely located "supervisory" controls normally effective to change the reference condition at a relatively slow rate.

It is the general aim of the invention to make possible quicker and more accurate changes in the value of a controlled variable condition in response to adjustments in the reference condition or control point, and particularly to substantially reduce searching and repeated readjustment of the reference condition in order to set the system for operation at a particular desired value of the variable condition.

Another object is to provide an automatic control system in which the controlled variable condition is brought to a different value more quickly when the reference condition is changed, thereby to facilitate the setting of the controlled variable to a desired steady state value despite the absence of an indicator to display the adjusted value of the reference condition, and despite the fact that the reference condition is adjusted by remote control at a relatively slow rate.

Still another object of the invention is to provide a system wherein the reference condition is adjusted by operation of motor means controlled from a remote location and wherein energization of the motor means produces automatically a forcing effect on the energy-responsive means which control the variable condition.

It is a further object of the invention to provide, in a system of the type set forth above, a temporary auxiliary signal of one polarity or the other whenever the reference condition-adjusting means are energized to increase or decrease the reference condition, such polarized, temporary auxiliary signal being utilized to effect a more rapid increase or decrease of the controlled variable than otherwise would be obtained.

Other objects and advantages will become apparent as the following description proceeds, taken in conjunction with the accompanying drawings, in which:

FIGURE 1 is a diagrammatic illustration of an automatic speed control or governing system embodying the features of the present invention;

FIG. 2 is a graphic illustration of certain variations or signals in the system of FIG. 1 when the means for changing the reference condition or set point are energized;

FIG. 3 is a schematic diagram, corresponding to part of FIG. 1, but illustrating a modified embodiment of the invention; and FIG. 4 is a set of graphs illustrating certain variations or signals in a system employing the apparatus illustrated by FIG. 3 when the reference condition adjusting means are energized.

While the invention has been shown and will be described in some detail with reference to particular embodiments thereof, there is no intention that it thus be limited to such detail. On the contrary, it is intended here to cover all modifications, alternatives, and equivalents falling within the spirit and scope of the invention as defined by the appended claims.

Referring now to FIG. 1, the automatic control system there diagrammatically shown is intended to maintain a controlled variable condition, in the present example the speed of a hydraulic turbine 10 driving an alternating generator 11, in agreement with an adjustable reference condition, here illustrated as the position of a movable wiper arm 12. Considered in a specific sense, therefore, the system of FIG. 1 operates to keep the speed of the turbine shaft 10a at a value or set point which corresponds to the position of the wiper arm 12, although it will become apparent from the following description that the invention may be embodied in any control system wherein any variable condition (such as position, temperature, pressure, etc.) is to be maintained in agreement with an adjustable reference condition.

In the exemplary system of FIG. 1, the hydraulic turbine 10 is driven by pressure fluid passing downwardly through a conduit or penstock 14 and controlled in its rate of flow by an adjustable wicket or gate valve 15 which is opened or closed by a cooperating pinion 16 and rack 18, the latter being connected with an hydraulic servo motor shown here as a piston 19 reversibly movable within a cylinder 20. As the piston 19 moves to the right or left, the gate valve 15 is opened or closed to increase or decrease the speed of the turbine 10 and alternator 11. The three-phase alternator 11 is here shown as connectable through a circuit breaker 21 to an electrical distribution system and load, the latter being represented schematically at 22. The circuit breaker 21 has three main contacts 21a, b, c leading from the three output terminals of the three-phase alternator 11 to the distribution lines, and the latter may be fed from the output terminals of other paralleled alternators (not shown).

Characteristically in closed loop speed control systems of the type only diagrammatically illustrated in FIG. 1, means are provided to create a first signal which varies according to the actual value of the controlled condition. In the present example, such means take the form of a three-phase A.C. tachometer generator 24 driven by the turbine-alternator shaft 10a and preferably having a permanent magnet field, so that the amplitude of its three-phase A.C. voltage is proportional to the turbine speed. The output voltage of the tachometer generator 24 is passed through a full wave rectifier and smoothing filter shown at 25 so that it appears as a D.C. voltage $e_n$ between two conductors 26, 28. The voltage $e_n$, which is representative of the actual value of the variable condition, has the polarity indicated in FIG. 1. The conductor 28 is for the sake of simplicity shown as being connected to a point of common or ground potential. The D.C. voltage signal $e_n$ thus varies in magnitude as a function of the actual value of the variable condition, and here varies in proportion to the changes in the actual value of the speed of the turbine 10.

As a further part of the speed control system, means are provided to create a second signal which varies according to the value of the adjustable reference condition or set point. As here shown, the adjustable wiper arm 12, which by its angular position represents the value of the reference condition or set point, is associated with a potentiometer 29 suitable energized from a D.C. voltage source. In the present instance, the upper end of the potentiometer 29 is connected to a positive D.C. voltage source represented by the symbol ⊕, and its lower end is connected to a point of ground potential. As the wiper arm 12 is adjusted in a counterclockwise or clockwise direction, therefore, a D.C. voltage signal $e_s$ appearing between the arm 12 and ground is increased or decreased in magnitude. A conductor 30 is electrically connected to the wiper arm 12 and transmits the speed setting voltage $e_s$, with the polarity indicated, which changes as a function of, and preferably in direct proportion to the value of, the speed setting or reference condition represented by the angular position of the wiper arm 12.

Means are provided to algebraically combine the actual speed signal $e_n$ and the desired speed or reference condition signal $e_s$ so as to produce a control signal which varies in polarity and magnitude according to the sense and extent of the difference therebetween. For this purpose, a summing magnetic amplifier 31 having a plurality of input windings is employed. Because the organization and operation of such a summing magnetic amplifier is well known to those skilled in the art, it need not be described in detail. It will suffice simply to note that the magnetic amplifier is excited by an alternating current source (not shown) and is of the push-pull type, having three output terminals 31a, 31b, 31c. The voltages $e_{o1}$ and $e_{o2}$ appearing between the terminals 31a, 31b and 31c, 31b are equal in magnitude and opposite in polarity when the algebraic sum of the input signals applied to the several input windings is zero. As that algebraic sum becomes positive the output voltages $e_{o1}$ and $e_{o2}$ respectively increase and decrease; and conversely, as that algebraic sum becomes progressively negative, the voltages $e_{o1}$ and $e_{o2}$ respectively decrease and increase. The combined voltages $e_{o1}$ and $e_{o2}$ constitute a control signal for the corrective adjustment of the variable condition, i.e., for correctively changing the speed of the turbine 10.

In order to utilize the speed signal $e_n$ and the speed setting signal $e_s$ to maintain the speed of the turbine shaft 10a at a value corresponding to the position of the wiper arm 12, these two signals are applied respectively to input windings $W_1$ and $W_2$ in the magnetic amplifier 31. For this purpose, the conductor 26 leads through the primary winding 32 of a transformer 34 (to be described below) and thence to an adjustable wiper 35a associated with a balancing potentiometer 35 connected across the winding $W_1$. It will be seen that the left terminal of the winding $W_1$ is connected to a point of ground potential, so that current which flows through that portion of the potentiometer 35 to the right of the wiper 35a must pass from right to left through the turns of the winding $W_1$. This direction of input signal current will be deemed, for purposes of explanation, to constitute a "negative" input, i.e., it tends to respectively decrease and increase the output voltages $e_{o1}$ and $e_{o2}$. The potentiometer 35 provides a trimming or gain adjustment which permits variation in the ratio between the speed of the turbine shaft 10a and the strength of the corresponding signal to the input winding $W_1$ of the magnetic amplifier 31.

The conductor 30, on which appears the speed setting voltage $e_s$, leads to the left terminal of the winding $W_2$, and the right terminal of that winding is connected to a point of ground potential. Thus, the corresponding current which flows through the winding $W_2$ from left to right is a "positive" input signal, and tends to buck or cancel the magnetic field produced by the current flowing through the winding $W_1$. In the absence of other input signals to the summing magnetic amplifier 31, the net control signal formed by the output voltages $e_{o1}$ and $e_{o2}$ corresponds in polarity and magnitude to the difference between the input signals $e_s$ and $e_n$.

In order to provide an additional input signal to the summing magnetic amplifier which increases the corrective response to sudden changes in the speed of the turbine shaft 10a, a signal is generated which varies as the time derivative of changes in the speed of the turbine 10. For this purpose, the transformer 34 includes a secondary winding 36 which is connected through a gain-adjusting rheostat 38 across a third input winding $W_3$. The transformer 34 has the effect of creating in its secondary winding 36 a voltage which varies as the first time derivative of the current flowing through the conductor 26 and primary winding 32. Thus, while the input winding $W_1$ is energized with a voltage and current proportional to the actual speed of the turbine 10, the input winding $W_3$ is energized with a voltage and current which varies as the time derivative of changes in the speed of the turbine 10.

In order to correctively adjust the speed of the turbine 10 in accordance with the algebraic sum of the input signals applied to the input windings $W_1$, $W_2$, and $W_3$, the output terminals 31a, 31b, 31c are connected to the three corresponding terminals of a center-tapped solenoid 40 operatively associated with an armature 41 which is connected by means of a rod 42 to a pilot valve 44. Whenever the algebraic sum of the three input signals to the windings $W_1$, $W_2$, $W_3$ is zero, the currents which pass through the left and right portions 40a, 40b of the solenoid 40 from the terminals 31a, 31b, 31c will be equal and opposite, and thus no force will be exerted on the armature 41. If, however, the speed of the turbine shaft 10a is below that speed which is represented by the position of the wiper arm 12, then the speed setting voltage $e_s$ will exceed in magnitude the speed-representing voltage $e_n$, and the voltage $e_{o1}$ applied to the left portion 40a of the solenoid will be increased while the voltage applied to the right portion 40b will be decreased. Under these conditions, a force is exerted to the left on the armature 41 and the latter tends to shift to the left so that a land 45 in the pilot valve 44 connects a port 46 in the pilot valve casing 48 with a conduit 49 leading to a fluid sump S. On the other hand, if the speed of the turbine shaft 10a exceeds the value represented by the position of the wiper arm 12, the voltage $e_n$ will exceed in magnitude the voltage $e_s$, and the unbalanced current supplied to the two solenoid portions 40a, 40b will exert a force to the right on the armature 41 and thus shift the valve land 45 to the right from its centered or neutral position, so that the port 46 is brought into communication with a conduit 50 leading to a fluid pressure source PS (such as a pump not shown).

The port 46 in the pilot valve housing 48 communicates with the left side of a differential piston 51 slidable in a cylinder 52 which is connected at its right end via a conduit 54 to a source of fluid pressure PS (not shown). Thus, when the pilot valve land 45 is centered and closes the port 46, the piston 51 is held stationary due to trapping of fluid in the left end of the cylinder 52. When, however, the pilot valve land 45 moves to the left or right of the centered position illustrated, then fluid is free to pass respectively from the left end of the cylinder 52 either to the sump S through the conduit 49 or to pass from the pressure source PS through the conduit 50 into the left side of the cylinder 52. Thus, when the pilot land 45 moves to the left or to the right, the differential piston 51 is caused to move to the left or to the right.

This motion of the piston 51 is transmitted through a rod 55 to a lever 56 pivoted at 58 and disposed between springs 59, 60 surrounding the pilot valve rod 42 and bearing against flanges 59a, 60a thereon. With this arrangement, a restoring force is transmitted to the rod 42 as the piston 51 reaches a new position corresponding to the force applied to the armature 41 by unbalanced currents flowing through the solenoid 40. The force transmitted through the springs 59 or 60 to the rod 42 recenters the pilot valve land 45 to reclose the port 46. It may therefore be said, in summary, that the piston 51 moves from its normal or steady state position to a new position which corresponds to the net control signal produced by the magnetic amplifier 31 and the force exerted on the armature 41.

The differential piston 51 is connected via a rod 62 with two spaced lands 64, 65 slidable within the casing 66 of a relay valve 68. Normally the land 64 covers and closes a port 70 in the valve casing 66; while the land 65 covers and closes a port 72 in the valve casing. Ports 69 and 71 lead from the casing 66 to the fluid sump S (not shown), while a conduit 74 leads through the valve casing 66 at a point intermediate the lands 64, 65 and is connected to the fluid pressure source PS. With this arrangement, when the relay valve lands 64, 65 shift to the left, the conduit 74 and the pressure source PS are brought into communication with the left end of the cylinder 20, while the right end of the cylinder 20 is connected to the sump S through the ports 71 and 72. Thus, the main servo piston 19 will be moved to the right to further open the gate valve 15. Conversely, when the valve lands 64, 65 shift to the right (as viewed in FIG. 1) as a result of movement of the differential piston 51, the left side of the cylinder 20 is brought into communication with the sump S through the ports 70, 69; while the right side of the cylinder 20 is brought into communication with the conduit 74 and the fluid pressure sources PS through the port 72. This permits fluid pressure to flow into the space on the right side of the piston 19, and fluid to flow out of the space on the left side of the piston 19 so that the latter moves to the left in a direction to reduce the opening of the gate valve 15, thereby to reduce the speed of the turbine 10.

With the foregoing in mind, it will be seen that whenever there is any discrepancy or error between the speed setting represented by the position of the wiper arm 12 and the actual speed of the turbine shaft 10a, so that the voltage $e_n$ is not equal to the voltage $e_s$, there will be a force exerted on the pilot valve armature 41 in a direction to move the pilot valve land 45 so that the differential piston 51 shifts one direction or the other. This in turn causes the relay valve 68 to energize the main piston 19 so that the latter correctively opens or closes the gate valve 15 and thus increases or decreases the speed of the turbine 10. In response to that corrective change in speed, the speed signal $e_n$ changes, and the corrective action continues until the control signal output from the amplifier 31 and the force on the pilot valve armature 41 are reduced to zero. By this closed loop arrangement, therefore, the gate valve is automatically adjusted until the speed of the turbine 10 agrees with the speed setting or reference condition represented by the position of the wiper arm 12. The time derivative signal which is applied through the transformer 34 to the magnetic amplifier input winding $W_3$ adds to the speed of this correction, but is effective only when the speed of the turbine shaft 10a is changing.

In order to give the speed control system a "drooping" characteristic for control of alternator loading after the circuit breaker 21 is closed, a droop signal $e_d$ is created which varies according to the position of the servo piston 19, such signal being algebraically combined with the signals $e_n$ and $e_s$ in the summing amplifier 31. As here shown diagrammatically, a potentiometer 75 is energized from an appropriate D.C. voltage source, and has its wiper 76 mechanically connected to the servo piston 19. The droop voltage $e_d$ thus varies in magnitude with changes in position of the piston 19, and this voltage is transmitted over the conductor 77 to the right terminal of an amplifier input winding $W_5$. The "droop" input signal tends to aid the speed signal $e_n$ so that for each setting of the wiper 12 there will be a corresponding steady state speed of the turbine 10, but with a "drooping" relation between the two.

In speed governing systems of the type here described, and particularly in governing systems for hydraulic turbines which drive alternators, it is necessary to bring the turbine 10 and alternator 11 precisely to a synchronous speed before the circuit breaker 21 can be closed to connect the alternator 11 to the distribution system 22 which is already being supplied from other alternators in the power generating system. In other words, when the alternator 10 is to be connected to the distribution system by closure of the circuit breaker 21, it is necessary to start the turbine 10 and bring it exactly to the proper speed by carefully setting the angular position of the wiper 12 and the magnitude of the speed setting-voltage $e_s$. This is termed "synchronization" of the alternator 11 prior to its being connected into the distribution system.

This adjustment of the wiper 12 is frequently controlled from a dispatcher's station by energization of a remotely located drive means or motor which is connected to position the wiper arm 12. As here diagrammatically represented in FIG. 1, a speed-setting motor 80 has its armature connected mechanically as represented by the dashed-line connection 81 to the wiper arm 12. The motor 80 is reversible and may be energized for rotation in one direction or the other through relatively long conductors 82, 84 which lead through contacts of switches $S_1$ and $S_2$ (located at the dispatcher's control desk) to an appropriate voltage source represented by the terminals 85, 86. If the switch $S_1$ is closed, its contacts $S_{1a}$ and $S_{2a}$ apply a voltage of one polarity to the conductors 82 and 84 so that the motor 80 is energized in a forward direction to move the wiper arm 12 counterclockwise, and thereby increase the magnitude of the reference condition-representing voltage $e_s$. This serves to increase the speed setting and increase the speed at which the turbine shaft 10a is controlled. On the other hand, if the switch $S_2$ is actuated, then the voltage of opposite polarity is applied from the source 85, 86 across the conductors 82, 84, so that the motor 80 rotates in a reverse direction and shifts the wiper arm 12 clockwise to decrease the speed-setting voltage $e_s$.

In an arrangement of this type the switches $S_1$ or $S_2$ may be closed for different periods of time so that the wiper arm will be moved through different angles by the motor 80, but the operator does not know exactly where the wiper arm is positioned when he releases the switch and de-energizes the motor 80. The speed at which the arm 12 is moved when the motor 80 is energized is purposely made relatively slow in order that the arm may be precisely adjusted to a particular position by closure of the switches $S_1$ or $S_2$ for different periods of time. If the motor 80 moved the arm rapidly, then it would be difficult to stop the motor 80 with the arm 12 exactly at the position which will make the turbine shaft 10a have the desired steady state speed.

This slow movement of the arm 12, and slow change in the speed-setting voltage $e_s$, results in the speed of the turbine 10 being slowly changed when the switch $S_1$ or $S_2$ is actuated to effect a change in the speed setting. There is inherently some time lag between the value of the voltage $e_s$ and the instant the turbine speed reaches a corresponding value, especially as the voltage $e_s$ is being changed. This time lag arises, in effect, from two sources, viz., the time delay between a change in the value of the speed setting voltage $e_s$ and the corresponding change in the position of the valve 15; and the time delay between a change in the position of the valve 15 and the corresponding change in the speed of the turbine 10. Thus there is a tendency for the operator to keep the motor 80 energized too long so that the wiper arm 12 is driven beyond the desired position, and some further readjustment or "searching" by successive actuation of the switch $S_1$ or $S_2$ is necessary before the turbine 10 is brought exactly to the desired steady state speed. Each time one of the switches $S_1$ or $S_2$ is actuated and then released, it requires (in one exemplary installation) about 40 to 50 seconds after the switch is released before the turbine 10 settles down to a new steady state speed. If six different tries are required, it will take about five or six minutes to get the turbine to the desired steady state speed.

A tachometer indicator 90, for example in the form of a voltmeter calibrated in r.p.m. and energized over a conductor 26a by the speed voltage $e_n$, may be located at the dispatcher's desk. If the switch $S_1$ or $S_2$ is held actuated until the desired new turbine speed is observed on the tachometer indicator 90, then after the switch is released the turbine speed will continue to change for a considerable period of time and by a fairly large amount, thus overshooting the desired steady state value. This would mean that the other one of the two switches $S_1$ or $S_2$ would have to be actuated in order to bring the turbine speed back to the desired value. The "cut and try" operation may be very time consuming, since 40 to 60 seconds may elapse between each release of the switch $S_1$ or $S_2$ and the instant that the operator can observe the new steady state speed to determine whether still another "cut and try" operation is needed. Because of the large change between the reading of the tachometer 90 at the instant that the switch $S_1$ or $S_2$ is released and the final speed of the turbine 10, it is difficult to forecast just when the switch should be released. A great many "cut and try" operations may be required.

In accordance with the present invention, a temporary auxiliary signal is created automatically in response to actuation of the means for adjusting the reference condition, and such signal is utilized in a manner to force a more rapid change than would otherwise occur in the speed of the turbine 10. Such auxiliary signal is of one polarity or the other when the reference condition is being increased or decreased, and it is combined algebraically with the other signals in a manner to increase the magnitude of the net control signal during the period that the reference condition is being changed.

As exemplified in FIG. 1, the means for creating the auxiliary signal includes positive and negative voltage sources here represented by batteries 91 and 92 connected to a common grounded junction 94. The positive terminal of the battery 91 and the negative terminal of the battery 92 are connected respectively through normally open contacts $S_{1c}$ and $S_{2c}$ of the switches $S_1$ and $S_2$ to a common conductor 95 which leads to the left terminal of an auxiliary input winding $W_4$ of the summing amplifier 31. In this manner, an auxiliary voltage $e_a$ is created and applied to the winding $W_4$ whenever the motor 80 is energized. The polarity of the auxiliary signal $e_a$ is made positive (uncircled signs in FIG. 1) when the motor 80 is running in a forward direction to increase the speed setting of the wiper arm 12; and conversely the signal $e_a$ is made negative (circled signs in FIG. 1) when the motor 80 is running in a reverse direction to decrease the speed setting. By applying the auxiliary signal $e_a$ to one winding of the magnetic amplifier 31, the auxiliary signal is algebraically combined with the first or speed signal $e_n$ and the second or speed-setting signal $e_s$. Because the auxiliary signal $e_a$ is of opposite polarities when the wiper 12 is being driven in a speed increasing or decreasing direction, it either adds to or subtracts from the effect of the speed-setting signal $e_s$ applied to the winding $W_2$. Thus the effective speed error and the net control signal provided at the output of the magnetic amplifier 31 are increased in magnitude by the presence of the auxiliary signal, so that the pilot valve 44, the differential piston 51, and the relay valve 68 are all shifted to a greater extent than would otherwise be the case, and the main servo piston 19 moves at a faster rate to effect corrective opening or closing of the gate valve 15.

This operation is more clearly understood by reference to the graphs of FIG. 2. Assume first that it is desired to increase the value of the automatically controlled turbine speed, and that the speed-increasing switch $S_1$ is actuated at the instant $t_1$ and deactuated at the time instant $t_2$. As shown by the curve 98, the speed of the motor 80 increases rapidly from the instant $t_1$ that it is energized until it reaches a steady speed represented by the horizontal portion of the curve 98. When the switch $S_1$ is depressed, the wiper arm 12 moves along the potentiometer 29 in a counterclockwise direction (FIG. 1) so that the speed-setting voltage $e_s$ increases from its original value 99a (FIG. 2) substantially linearly with time as represented by the graph portion 99b. When the motor 80 is deenergized at time instant $t_2$, the wiper arm 12 comes to a stop with the speed-setting voltage $e_s$ having been increased to a second value 99c.

However, at the instant $t_1$ when the switch $S_1$ is actuated, the auxiliary voltage $e_a$ immediately increases from a zero value to a finite positive value represented at 100 in FIG. 2. When the switch $S_1$ is released at the time instant $t_2$, the auxiliary voltage $e_a$ returns to zero.

Because the auxiliary voltage $e_a$ applied to the amplifier input winding $W_4$ in effect adds directly to the input signal $e_s$ applied to the winding $W_2$, the net speed-setting signal $e_s+e_a$ varies as represented by the graph 101 in FIG. 2. It will be seen that at the time instant $t_1$, the effective speed-setting voltage formed by the algebraic sum of the voltage $e_s$ plus the voltage $e_a$ increases immediately from an initial value 101a to a value 101b. Then, the effective speed-setting voltage increases linearly along the curve portion 101c until it reaches a value 101d. At the time instant $t_2$ when the switch $S_1$ is released, the auxiliary voltage $e_a$ disappears so that the effective voltage $e_s+e_a$ drops immediately to a final value represented at 101e.

In overall result, therefore, the output of the magnetic amplifier 31 is increased in magnitude, and a corrective force is applied to the armature 41 which is greater in magnitude than it would otherwise be. Thus, the pilot valve 45 is opened to shift the differential piston 51 to a position more greatly displaced from its equilibrium position, and the relay valve 68 is opened more widely to cause the piston 19 to open the valve 13 at a greater rate. In consequence, the position of the piston 19 and the movable gate of the valve 15 change almost in unison with changes in the position of the wiper arm 12, so that the time delay between the change in the magnitude of the voltage $e_s$ and a corresponding change in the gate position is effectively eliminated. By observing the tachometer indicator 90, the operator may release the switch $S_1$ when the indicated turbine speed is slightly below the desired value. The turbine will then come to an adjusted speed after only a very short delay. Since the magnetic amplifier 31 now operates in the absence of the auxiliary signal $e_a$, the speed of the turbine is brought to a value which corresponds to the position of the wiper 12. It has been found from practical experience with this arrangement for creating and utilizing the auxiliary signal $e_a$, the speed of the turbine will continue to increase slightly after the switch $S_1$ is released, but it will not change to such an extent nor take so long to settle down to a steady state value, as in the case where the auxiliary signal $e_a$ is not provided. In the exemplary installation mentioned above, it has been found that within about ten seconds after the switch $S_1$ or $S_2$ is released, the turbine 10 reaches a new steady speed value, and that with only two or three "cut and try" actuations of those switches, the turbine speed can be set to any desired value.

The right portion of FIG. 2 illustrates the variations in the motor speed, the speed-setting voltage $e_s$, the auxiliary voltage $e_a$, and the effective speed-setting voltage formed by $e_s+e_a$ whenever the switch $S_2$ is actuated to effect a decrease in the speed setting. As shown by the curve portion 98a, the speed of the motor 80 will have a finite negative value between the instants $t_3$ and $t_4$ that the switch $S_2$ is actuated and deactuated. During this period the wiper arm 12 will be driven in a clockwise direction (FIG. 1) so that the voltage $e_s$ will decrease substantially linearly from its original value at 99c to a final value at 99d. However, during this time interval between instants $t_3$ and $t_4$, the auxiliary voltage $e_a$ has a negative value represented at 100a. The effective speed-setting signal represented by $e_s+e_a$ during this period is represented, therefore, by the curve portion 101f, this effective signal being considerably lower than the speed-setting voltage $e_s$ by itself. Thus, the gate valve 15 is moved in a closing direction more rapidly than it otherwise would be. If the switch $S_2$ is deactuated at the instant $t_4$ when the tachometer indicator 90 shows the turbine speed to be only slightly greater than the desired value, then the turbine speed will continue to decrease slightly for about a ten-second interval, and will then stabilize at or near the desired value.

FIG. 3 corresponds to a portion of FIG. 1 and illustrates a modified arrangement for creating the auxiliary signal. In this modified arrangement, the speed-setting wiper 12, movable along the potentiometer 29, is drivingly connected, as indicated at 81, to the armature 105 of a reversible series motor 106 having a "forward" field winding 107 and a "reverse" field winding 108. The motor 106 is selectively energized to drive the wiper 12 in a counterclockwise or clockwise direction by actuation of the single pole double throw switch 109. When the switch 109 is closed to its contact 109a, the motor field winding 107 and armature 105 are connected in series between the positive and negative terminals 85, 86 of a D.C. voltage source so that the wiper 12 is driven in a counterclockwise direction to increase the speed setting. Conversely, if the switch 109 is closed to its contact 109b, the motor field winding 108 and armature 105 are connected in series between the terminals 85 and 86 of the D.C. voltage source. This causes the motor 106 to drive the wiper arm 12 in a clockwise direction to decrease the speed setting and the speed-setting voltage $e_s$.

In order to create the auxiliary voltage $e_a$, circuit connections are made to the two field windings 107, 108. As here shown, a resistor 110 is connected in series with a capacitor 111 across the remote extremities of the two field windings 107 and 108, the latter being joined at a common junction 112. With this arrangement, when the motor 106 is energized to run in a forward direction and increase the speed setting of the wiper arm 12, the capacitor 111 is charged to a voltage of one polarity (uncircled signs in FIG. 3) which then causes corresponding current flow through a gain-control resistor 114 and the magnetic amplifier input winding $W_4$. On the other hand, when the motor 106 is energized to run in a reverse direction and decrease the speed-setting position of the wiper arm 12, the capacitor 111 is charged to a voltage of the opposite polarity (circled signs in FIG. 3) so that an auxiliary signal $e_a$ of the opposite polarity is applied to the input winding $W_4$. The purpose of the resistor 110 and the capacitor 111 is to partially smooth out the extremely high voltage spike which is created at the instant that either of the two field windings is energized or de-energized. This voltage spike, unless it is excessive in amplitude, is of advantage in improving the operation of the system in response to the auxiliary voltage $e_a$.

Referring to FIG. 4, let it be assumed that the switch 109 is closed to its contact 109b at the instant $t_5$, and reopened at the instant $t_6$. The motor armature 105 will thus have the speed variation represented by the curve 115. The speed-setting voltage $e_s$ appearing on the wiper arm 12 and applied to the input winding $W_2$ will increase from its original value 116a linearly as shown at 116b to a final value 116c. However, at the instant $t_5$ when the switch 109 is closed, the voltage $e_f$ represented by the graph 118 and appearing across the two field windings 107, 108, will increase abruptly to a peak value 118a due to the fact that current flowing through the winding 107 will induce a voltage in the winding 108, and the fact that very little back E.M.F. is generated in the armature 105 until the latter builds up an appreciable speed. Thus, as the armature 105 increases in speed, the voltage $e_f$ will be gradually reduced to an intermediate value represented at 118b in FIG. 4. Then, when the motor 106 is de-energized by the opening of a switch 109 at the instant $t_6$, the voltage appearing across the field windings 107, 108 will decrease abruptly to zero and in fact have a transient negative spike shown at 118c in FIG. 4 due to the inductive nature of the field windings. This negative spike is created by the sudden decrease of current flow through the field winding 107 and the resultant voltage induced by inductive coupling in the opposite field winding 108.

With the foregoing variation of the voltage $e_f$ in mind, it will be apparent that the voltage $e_a$ which appears across the capacitor 111 will have substantially the shape represented by the graph 119 in FIG. 4. Because the resistor 110 and the capacitor 111 tend to integrate or smooth out abrupt variations in the voltage $e_f$, the voltage $e_a$ will have a relatively smaller momentary peak 119a immediately following the instant $t_5$ when the switch 109 is closed. Then the voltage $e_a$ will decrease to an intermediate value 119b; and it will subsequently have a small negative peak 119c at the instant $t_6$ when the switch 109 is opened. The effective speed-setting signal represented by $e_s + e_a$ is illustrated by the graph 120 in FIG. 4 and includes small pulses $120_a$ and $120_c$ of opposite polarity at the instants $t_5$ and $t_6$ when the switch 109 is closed and opened, such pulses being separated by a gradually rising portion $120b$. As a result of the auxiliary signal $e_a$ being added to the increasing speed-setting signal $e_s$ in the magnetic amplifier 31, the solenoid 40 (FIG. 1), armature 41, pilot valve 44, differential piston 51, and relay valve 68 operate to cause the main servo piston 19 to open the valve 15 faster than otherwise would be the case. The small pulse 119a which appears on the auxiliary voltage $e_a$ assists in initiating this rapid movement of the piston 19, while the negative going pulse 119c which appears in the voltage $e_a$ assists in stopping the piston 19 after the switch 109 has been opened, so that the speed control system comes to equilibrium based on the adjusted value of the speed-setting voltage $e_s$.

From the foregoing it will be apparent that the present invention makes the net control signal produced by the algebraic combining means (amplifier 31) greater than it would otherwise be during those periods that the reference condition is being adjusted. The auxiliary signal $e_a$ is always of the proper polarity, whether the reference condition is being increased or decreased, to make the net control signal greater in magnitude in the sense to increase the corrective change of the variable condition. Thus, a quicker transition in the value of a controlled variable condition, such as the speed of the turbine 10, in response to changes in the reference condition by energization of adjusting means is achieved. The corrective action to produce a change in the controlled variable condition is made more rapid, whether that condition is to be increased or decreased in value as a result of an increase or decrease in the value of the reference condition. While the foregoing description has specifically treated embodiments of the invention in which electrical signals $e_n$, $e_s$, $e_a$ are created and algebraically combined in order to produce this advantageous operation, it will be apparent to those skilled in the art that corresponding hydraulic or pneumatic signals or variations may also be produced and combined in the manner which has been described. The particular nature of the signals is not critical.

The invention as illustrated and described thus far serves advantageously to facilitate bringing the turbine 10 up to synchronous speed before the circuit breaker 21 is closed to connect the alternator 11 to the distribution system. The frequency and phase comparing means well known in the art and used for determining the actual instant of complete synchronization have not been shown, but it will be apparent that manipulation of the switches $S_1$, $S_2$ (FIG. 1) or 109 (FIG. 3) will enable the speed-setting potentiometer arm 12 to be adjusted to produce the desired speed of the turbine 10 and without repeated readjustments and "searching." Once the alternator 11 has been brought to synchronous speed, and the circuit breaker 21 closed to connect it to the distribution line, however, the speed of the alternator 11 and turbine 10 will be maintained by synchronizing torque. Under these conditions, the adjustment of the gate valve 15 determines not the speed of the alternator 11, but rather the electrical load delivered by the alternator. To produce changes in loading of the alternator in response to change in the setting of the gate valve 15, the governing system shown in FIG. 1 includes the potentiometer 75 for producing the droop signal $e_d$ which is added algebraically to the other input signals of the magnetic amplifier 31. The effect of the droop input voltage $e_d$ is "negative" as here shown, i.e., it tends to buck or cancel the reference voltage $e_s$.

When the circuit breaker 21 is closed, the speed voltage $e_n$ is constant because the turbine speed is held constant by synchronizing torque. As the wiper 12 and the reference condition voltage $e_s$ are adjusted, therefore, the servo piston and the gate valve 15 are correspondingly adjusted until the change in the doop voltage $e_d$ cancels the change in the reference condition voltage $e_s$ and the net output of the magnetic amplifier 31 is reduced to zero. This change in the setting of the gate valve 15 thus changes the electrical load delivered by the alternator to the distribution system. The point to be observed, and which by itself is well known in the art, is that now the loading of the alternator is determined by the position of the wiper arm 12. The "reference condition" or load setting is the position of the wiper arm 12, but the automatically controlled "variable condition" is the alternator load.

With the alternator 11 connected to the distribution system, it is frequently desirable to change or adjust the automatically controlled loading of that alternator. This may be accomplished by a dispatcher who manipulates the switches $S_1$, $S_2$ (FIG. 1) or the switch 109 (FIG. 3) to cause the associated motor to drive the wiper arm 12 to a new position. But with the arrangement previously described, each time that the motor is energized to increase or decrease the reference condition (i.e., to drive the wiper 12 counterclockwise or clockwise), the temporary signal $e_a$ will be created, as previously described. This temporary signal, therefore, will increase the magnitude of the net control signal produced by the magnetic amplifier 31, and the servo piston 19 will thus be driven more quickly toward the new position necessary to establish the new load on the alternator 11. The same operation and advantages set forth above will obtain, and the system will be brought to equilibrium at the new load setting more rapidly than would otherwise be the case in the absence of the auxiliary signal $e_a$. It is to be understood, therefore, that the present invention may be used equally well in a system which controls a variable condition which is either the speed of a rotating part, the loading of an alternator, or for that matter any other controlled variable which is to be kept in agreement with an adjustable reference condition or set point.

I claim:

1. In a control system for maintaining a variable condition at a desired reference value, the combination comprising means for producing an error signal generally representative of the difference between the actual value of said variable condition and said reference value, means responsive to said error signal for correctively changing said variable condition, power means selectively energizable to adjust the reference value, and means directly responsive to energization of said power means for temporarily increasing said error signal above the value it would otherwise have.

2. In a control system for maintaining a variable condition in agreement with a reference condition, the combination comprising means for creating a first signal representative of the actual value of said variable condition, means for creating a second signal representative of the value of said reference condition, power means selectively energizable for adjusting said last-named means to change the control point, means directly responsive to energization of said power means for creating an auxiliary signal, means for algebraically combining said first, second and auxiliary signals to produce a net control signal, and means for changing said variable condition in accordance with said net control signal.

3. In a system for maintaining a variable condition in agreement with a reference condition, the combination comprising energy-responsive means for changing the value of said variable condition, means for creating a first signal which varies as a function of the actual value of said variable condition, power means selectively energizable for adjusting said reference condition to increase or decrease its value, means for creating a second signal which varies as a function of the value of said reference condition, means directly responsive to energization of said power means for creating an auxiliary signal which is of one polarity or the other when the value of the reference condition is being increased or decreased, means for algebraically combining said first, second, and auxiliary signals to produce a net control signal, means for operating said energy-responsive means in accordance with said net control signal, said combining means and said operating means including means which tend to unusually increase or decrease the value of said variable condition due to the effect of said auxiliary signal when the latter is respectively of said one polarity or of said other polarity.

4. In a system for maintaining a variable condition in agreement with a reference condition, the combination comprising energy-responsive means for changing the value of said variable condition, means for sensing the actual value of said variable condition and producing a first signal which varies substantially in proportion thereto, power means selectively energizable for adjusting the value of said reference condition, means for producing a second signal which varies substantially in proportion to the value of said reference condition, means directly responsive to energization of said power means in a sense to increase or decrease the value of said reference condition for respectively creating an auxiliary signal of one polarity or the other, means for algebraically combining said first, second, and auxiliary signals to produce a control signal which varies as the difference between said first and second signals plus the auxiliary signal when its exists, and means for operating said energy-responsive means in accordance with said control signal so that the variable condition is more quickly increased or decreased in response to the auxiliary signal being of said one polarity or said other polarity, respectively.

5. In a system for maintaining a variable condition in agreement with a reference condition, the combination comprising energy-responsive means for changing the value of said variable condition, means for producing a first signal representative of the actual value of said variable condition, means for producing a second signal representative of the value of said reference condition, means for adjusting said reference condition, a motor susceptible of remote control and connected to drive said adjusting means, means directly responsive to energization of said motor for producing an auxiliary signal, means for algebraically combining said first, second, and auxiliary signals to produce a control signal, and means for operating said energy-responsive means in accordance with said control signal.

6. The combination set forth in claim 5 further characterized in that said motor is reversible and energizable to run in forward or reverse directions to increase or decrease said reference condition, and in that said auxiliary signal-producing means includes means for making said auxiliary signal of one polarity or the opposite polarity in response respectively to forward or reverse energization of said motor.

7. In a system for maintaining a variable condition in agreement with an adjustable reference condition, the combination comprising means for creating a first signal which varies in relation to the actual value of the variable condition, adjustable means for creating a second signal which represents said reference condition, a reversible series motor having forward and reverse fields and an armature mechanically connected to adjust said adjustable means and thereby change said reference condition, means for selectively energizing said motor through its forward or its reverse field, circuit means connected to said motor fields for producing a voltage which is positive when the motor is energized in a forward direction and negative when the motor is energized in a reverse direction, means for algebraically combining said first and second signals and said voltage to derive a control signal, and means for changing the said variable condition in response to said control signal.

8. The combination set forth in claim 7 and further characterized in that said forward and reverse fields are connected to a common junction and wherein said circuit means comprises a resistor and capacitor connected in series across the remote extremities of said fields, so that said positive or negative voltage appears across said capacitor without large transient spikes.

References Cited by the Examiner

UNITED STATES PATENTS

| | | | |
|---|---|---|---|
| 2,439,198 | 4/1948 | Bedford | 318—18 |
| 2,496,391 | 2/1950 | Hall | 318—28 |
| 2,790,092 | 4/1957 | Guth | 240—40 |
| 2,811,651 | 10/1957 | Lepley | 290—40 X |
| 2,908,826 | 10/1959 | Oldenburger | 290—40 |

ORIS L. RADER, *Primary Examiner.*